United States Patent

Chang et al.

[11] Patent Number: 5,822,681
[45] Date of Patent: Oct. 13, 1998

[54] METHOD FOR ASSIGNING BAND PORT CHANNELS IN AN UNLICENSED PERSONAL COMMUNICATIONS SYSTEM

[75] Inventors: Li-Fung Chang, Holmdel; Anthony Robert Noerpel, Long Branch; Ashok Ranade, Warren; Nelson Ray Sollenberger, Tinton Falls, all of N.J.

[73] Assignee: Bell Communications Research, Inc., Morristown, N.J.

[21] Appl. No.: 590,997

[22] Filed: Jan. 24, 1996

[51] Int. Cl.⁶ .................................................. H04B 15/00
[52] U.S. Cl. ........................ 455/62; 455/452; 455/166.1
[58] Field of Search ............................... 455/464, 465, 455/452, 62, 63, 161.1, 161.3, 161.2, 509, 513, 514

[56] References Cited

U.S. PATENT DOCUMENTS

| | | | |
|---|---|---|---|
| 5,212,831 | 5/1993 | Chuang et al. | 455/54.1 |
| 5,263,176 | 11/1993 | Kojima et al. | 455/34.1 |
| 5,448,754 | 9/1995 | Ho et al. | 455/43.1 |
| 5,475,677 | 12/1995 | Arnold et al. | 370/29 |
| 5,734,982 | 3/1998 | Endo et al. | 455/62 |
| 5,737,705 | 4/1998 | Ruppel et al. | 455/452 |

*Primary Examiner*—Edward F. Urban
*Attorney, Agent, or Firm*—Joseph Giordano; David A. Hey; Loria B. Yeadon

[57] ABSTRACT

A number of RPs stagger the times in which they begin searching for available channels. In a preferred method, one of a plurality of RPs in a UPCS system is selected to have a first start time. The system determines which RPs in the system can "see" the selected RP. Each of these RPs is given a unique stagger start time. This process may be repeated until each RP in the system is assigned a stagger start time. Alternatively, if there are fewer RPs in the system than there are available stagger start times, each RP may be selected to have a unique stagger start time.

6 Claims, 5 Drawing Sheets

16 STAGGER STARTS 2.5 msec APART

Th=ADAPTIVE AUTONOMOUS LBT THRESHOLD MEASUREMENTS
MEASURE=MEASURE STATES USING LBT ETIQUETE AND PREVIOUSLY DETERMINED THRESHOLD

METHOD FOR ASSIGNING BAND PORT CHANNELS IN AN UNLICENSED PERSONAL COMMUNICATIONS SYSTEM

RELATED APPLICATION

This application includes subject matter related to a co-pending application entitled "Method for Unlicensed Band Port to Autonomously Determine Interference Threshold and Power Level" Ser. No. 08/590,751 and filed on Jan. 24, 1996 and invented by Li Fung Chang and Anthony Noerpel and assigned to the assignee of the invention disclosed herein. The contents of this related application are incorporated herein by reference.

FIELD OF THE INVENTION

The present invention is directed to assigning channels in a wireless communication system and, more particularly, to a method for assigning communication channels to radio access ports in the unlicensed personal communications spectrum.

BACKGROUND OF THE INVENTION

The Federal Communications Commission (FCC) has designated the frequency band between 1920 and 1930 MHz as an unlicensed band for isochronous personal communications services (UPCS). This unlicensed band will be used primarily to support wireless telephone and circuit switched data. The maximum permitted transmission power of 55 mW for 300 kHz bandwidth limits UPCS to indoor use, because the power level is too low for effective use outdoors.

FIG. 1 is an example of a simple UPCS system 50. A customer has a mobile terminal (MT) 52, such as a wireless telephone which is in wireless communication with a radio port (RP) 54 connected to a radio port control unit (RPCU) 56. A UPCS system 50 may have a number of RPs 54 connected to the same or a different RPCU 56. The RPCU 56 may be connected to a communications network, such as an ordinary telephone line 58 which connects to a local switch 60. The switch connects to a telephone network, such as a public switched telephone network (PSTN) 62. The customer may have personal information, such as a telephone or personal communications number, call forwarding and routing information, account information, credit and billing information, and the like stored in a telephone network database, called a Home Location Register (HLR) 64, servicing the customer's home area.

The 1920–1930 MHz band was previously allocated to licensed point-to-point microwave communication. The FCC has instituted strict requirements on the use of UPCS systems, at least until all of the point-to-point microwave systems are cleared from the band. It is expected that this clearing process may take as long as seven years. To this end, the FCC requires that UPCS components cannot transmit if they move outside of certain authorized areas. For this reason, it is generally believed that only large, geographically bound systems, such as Centrex and PBX systems may be used until the band is cleared. It also implicitly requires that the RP 54, not the MT 52 (which is capable of moving outside of authorized areas), initiate communications.

Because the UPCS band is unlicensed, it is available for use without paying the FCC a license fee for each piece of radio equipment installed. To permit the band to be used fairly by a number of radio ports, such as RPs from unlike systems or from a number of service providers, within the same area, the FCC has implemented requires an etiquette for obtaining channels in the UPCS band. This etiquette is called the Listen-Before-Talk (LBT) etiquette.

In the LBT etiquette, each RP finds an available channel in the band on which to transmit. The FCC has divided the band into eight 1.25 MHz channels. "Narrow band"(e.g., less than 625 kHz occupied signal bandwidth) communications devices are required to begin searching for available channels in the lower 3 MHz of the band. "Wide band" communications devices are required to begin searching for available channels in the higher 3 MHz in the band. The following description will refer to narrow band communications devices, but the reader understands that it is equally applicable to wide band communications devices. As described below, protocols in the UPCS spectrum may divide each 1.25 MHz channel into a number of system channels.

The RP 54 begins its search by measuring a first channel (e.g., randomly selected from the system channels contained in the bottom 3 MHz of the band) in the band to determine if interference below a threshold (the FCC requires the threshold to be no greater than 30 dB above a background level, except in special cases). Interference above the threshold level indicates that the channel may already be taken by a nearby RP and is not available. The RP monitors the channel for the threshold level of interference for 10 ms before it can transmit, to make sure that another RP has not already acquired the channel. If the channel has interference beyond the threshold at any time during the 10 ms period, it immediately abandons that channel and searches the next higher channel to determine if it is available. An RP acquires the first available channel it monitors and detects no interference above the threshold for 10 ms. Once the RP 54 has acquired a channel, it transmits immediately on that channel to "advertise" its availability for communications with an MT 52. If the RP 54 does not establish communication with an MT within that 30 second time period, the RP relinquishes the channel, and begins again its search for an available channel.

One problem with this etiquette is that a successful UPCS spectrum implementation having a large number of RPs should frame synchronize the RPs. This frame synchronization makes it likely that more than one RP will simultaneously monitor a channel for 10 ms and then acquire it, resulting in unacceptable co-channel interference. Once two (or more) synchronized RPs acquire the same channel, it is likely that they will continue to do so, rendering the ports relatively useless.

The following description uses the personal access communications for unlicensed bands (PACS-UB) protocol to illustrate the present invention. The reader understands, however, that the principles of the invention apply to any protocol operable in the UPCS spectrum or which uses an LBT etiquette. PACS-UB further divides each of the eight 1.25 MHZ channels into four 300 kHz system channels, providing 32 total channels. FIG. 2 illustrates a preferred system channel structure 200 for PACS-UB. A channel separation 202 of 100 kHz ensures that no channel overlaps the FCC 1.25 MHZ channels. A 50 kHz guard band 204 is found at the beginning and end of the isochronous band.

PACS-UB meets the FCC UPCS requirements by using a "blinking beacon" protocol. This means that the RPs 54 transmit "beacon" signals that MTs 52 use to find RPs with which they can establish a communications channel. This "blinking beacon" is preferably accomplished using the PACS-UB hyperframe and superframe structures, illustrated in FIG. 3. FIG. 3A illustrates a preferred PACS-UB hyperframe 300 which comprises 30 one second superframes 302. This arrangement satisfies the FCC requirement that an RP 50 may only hold a acquired channel for 30 seconds, unless it establishes communication with an MT 52. These superframes 152 are system broadcast channel superframes (SBC-SF). FIG. 3A shows one type of superframe 302' called an access superframe. An RP broadcasts an access superframe 302' when it is attempting to acquire a channel. Each access SBC-SF is preferably divided into four phases 304, 306, 308, 310. These phases are:

1. a first 200 ms period 304 (phase A) during which an active RP 54 transmits incoming call alerts or short messages to the MT 52;
2. a second 200 ms period 306 (phase B) during which an active RP 54 transmits system and other service information;
3. a 400 ms period 308 (phase C) for idle ports to select a channel on which to transmit based on signal strength; and
4. a third 200 ms period 310 (phase D) permitting MTs 52 to select an RP 54 having the best signal strength to which the MT has access rights (i.e., the MT is from the same system).

FIG. 3B shows a second type of superframe 302" called a basic superframe. An RP transmits a basic superframe 302" when it has acquired a channel and is seeking to establish communication with an MT. Each basic SBC-SF is preferably divided into two phases, 304, 306'. These phases are: (1) a first 200 ms 304 (phase A) during which an active RP transmits incoming alerts or short messages to the MT 52; and (2) an 800 ms 306'(phase B) during which an active RP transmits system and other service information.

To conform to the access etiquette, an RP first employs an access SBC-SF to a selective, suitable transmission channel. Once a channel has been identified, an RP uses the basic SBC-SF format for further transmissions for up to 30 seconds for unacknowledged transmission. FIG. 3C illustrates a hyperframe 300 of an unacknowledged RP transmission. A hyperframe begins with an access SEC-SF 302' to acquire a channel. The RP acquires a transmission channel and begins "advertising" for an MT with which to establish communication. This is done by broadcasting a number of one-second long basic superframes 302". The RP repeats the basic SBC-SF if it does not establish communication with an MT. This continues for thirty seconds. After thirty seconds of unacknowledged transmission, the RP relinquishes access to the transmission channel. After the channel is relinquished, the RP again transmits an access SBC-SF in order to acquire a channel.

It is an object of the present invention to provide a method for a number of radio ports to "acquire" available channels without co-channel interference, even where the ports are located in the same general location and/or frame synchronized.

SUMMARY OF THE INVENTION

This and other objects are achieved by the present invention, which provides for a method wherein a number of RPs stagger the times in which they begin searching for available channels.

In a preferred method, one of a plurality of RPs in a UPCS system is selected to have a first start time. The system determines which RPs in the system can "hear" the selected RP. Each of these RPs is given a unique stagger start time. RPs that cannot "hear" each other may be assigned the same stagger start time. This process may be repeated until each RP in the system is assigned a stagger start time. Alternatively, if the number of RPs is less than or equal to the number of available stagger start times, each RP may be assigned a unique stagger start time.

BRIEF DESCRIPTION OF THE DRAWINGS

The present invention is described with reference to the following drawings.

DETAILED DESCRIPTION OF A PREFERRED METHOD

The present invention provides a method for a number of RPs to acquire available channels, even if the RPs are located in the same general location and if they are frame synchronized. A method according to the present invention provides for staggering the channel searching procedure start times of RPs that can "hear" each other (e.g., can detect each other's transmission.) This avoids co-channel interference because RPs that can detect each others transmissions are prevented from having synchronized 10 ms monitoring periods. A preferred way to accomplish this begins with dividing a PACS-UB superframe phase C into a number of stagger start periods.

Figure 1:
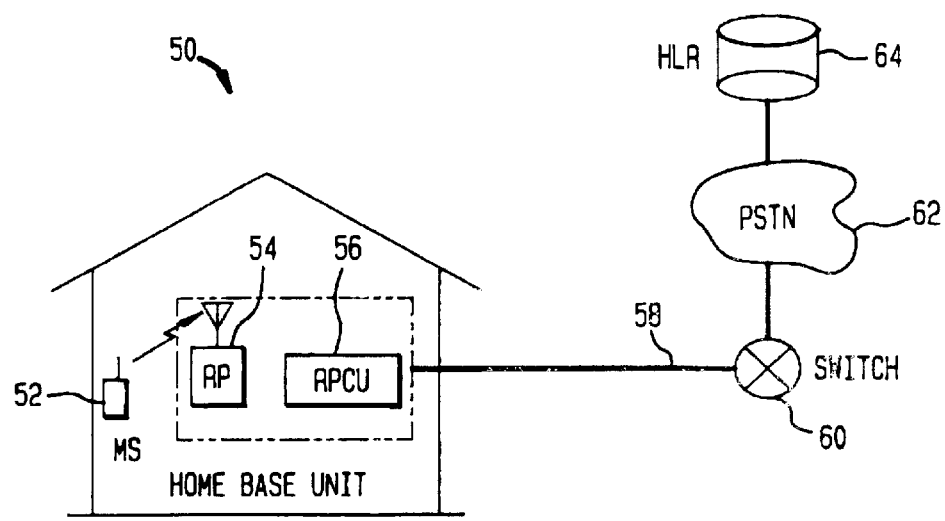
FIG. 1 illustrates an unlicensed personal communications system.
Figure 2:
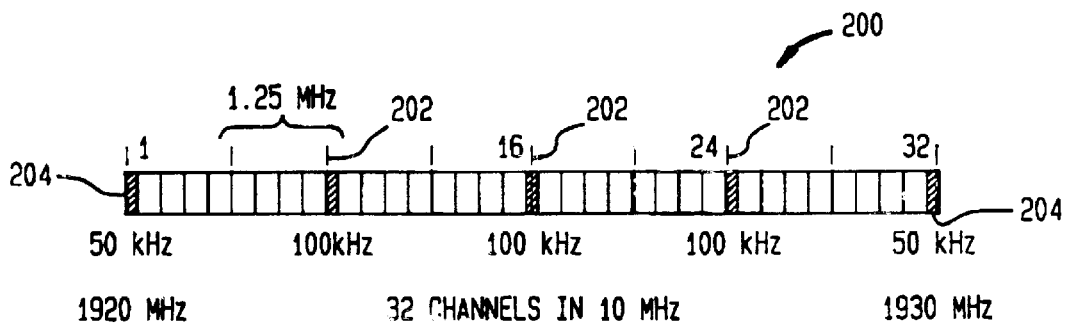
FIG. 2 illustrates the standardized system channelization for a PACS-UB protocol.
Figure 3A:
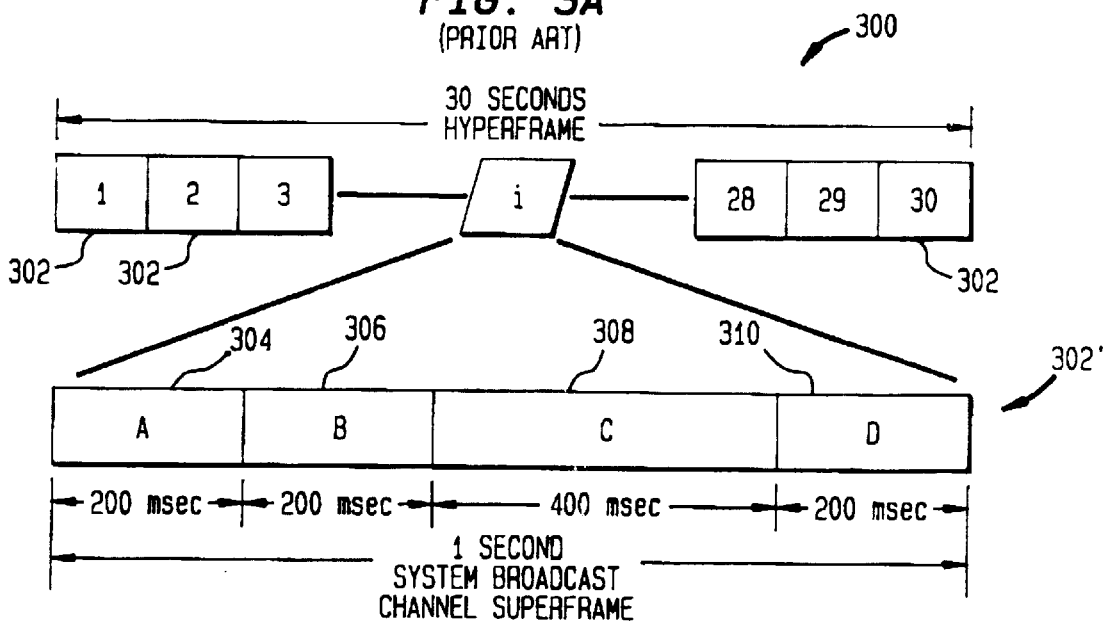
FIG. 3A illustrates a hyperframe/superframe structure of a preferred PACS-UB protocol, showing an access superframe structure.
Figure 3B:
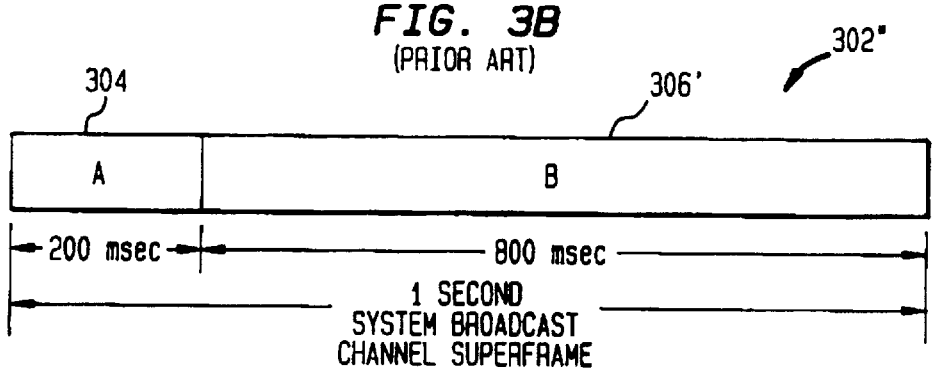
FIG. 3B illustrates a basic superframe structure of a preferred PACS-UB.
Figure 3C:
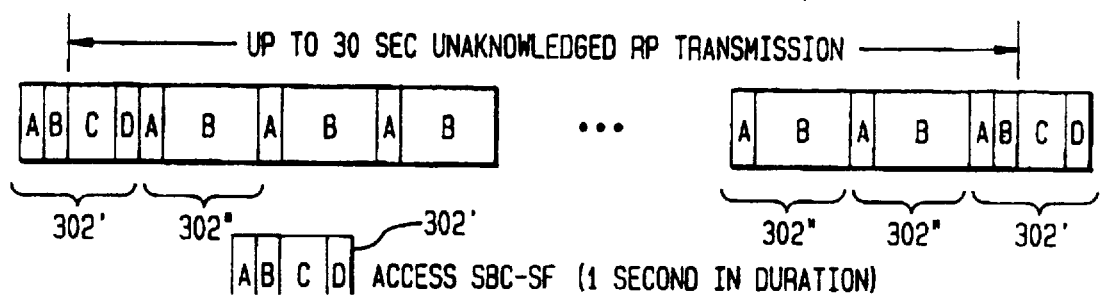
FIG. 3C illustrates an unacknowledged system broadcast superframe sequence.
Figure 4:
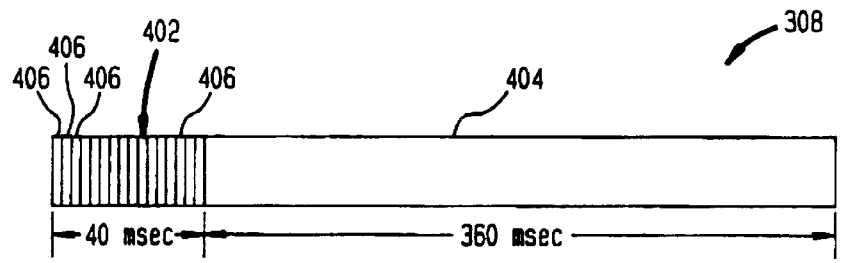
FIG. 4 illustrates a preferred structure of a superframe phase C according to the present invention.

FIG. 4 illustrates a preferred PACS-UB phase C 308 according to the present invention. Phase C 308 is divided into two parts 402, 404. A first part 402 is divided into a number of timed intervals 406. In the present invention, it is preferred that the first part 402 be 40 ms divided into sixteen equally spaced 2.5 ms intervals 406. A person skilled in the art recognizes that other time intervals may be used as well. A stagger start is timed to begin during each time interval. Thus, an RP starting its channel searching procedure at a particular time will not have the same 10 ms monitoring period as RPs beginning their searches at other start times, even though there may be other RPs in the same general location also searching for channels. In the preferred method, there are sixteen stagger starts per superframe (e.g., 16×2.5 ms) and 30 superframes per hyperframe. Thus, in this preferred method there are 480 total stagger starts per hyperframe. This permits up to 480 RPs to each have an exclusive stagger start time to begin its channel search.

Figure 5A:
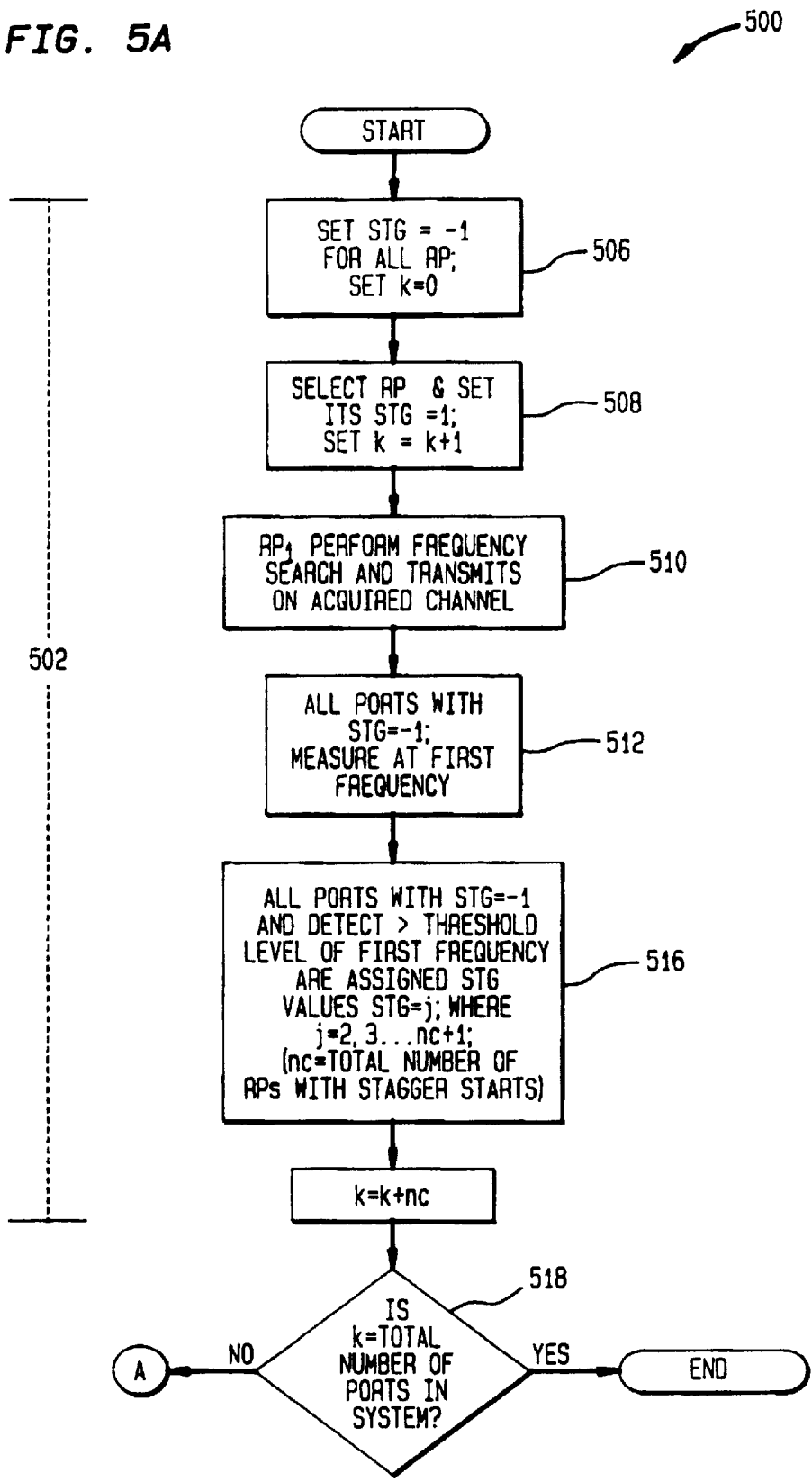
FIGS. 5a and 5b are a flow chart of a preferred method according to the present invention.
Figure 5B:
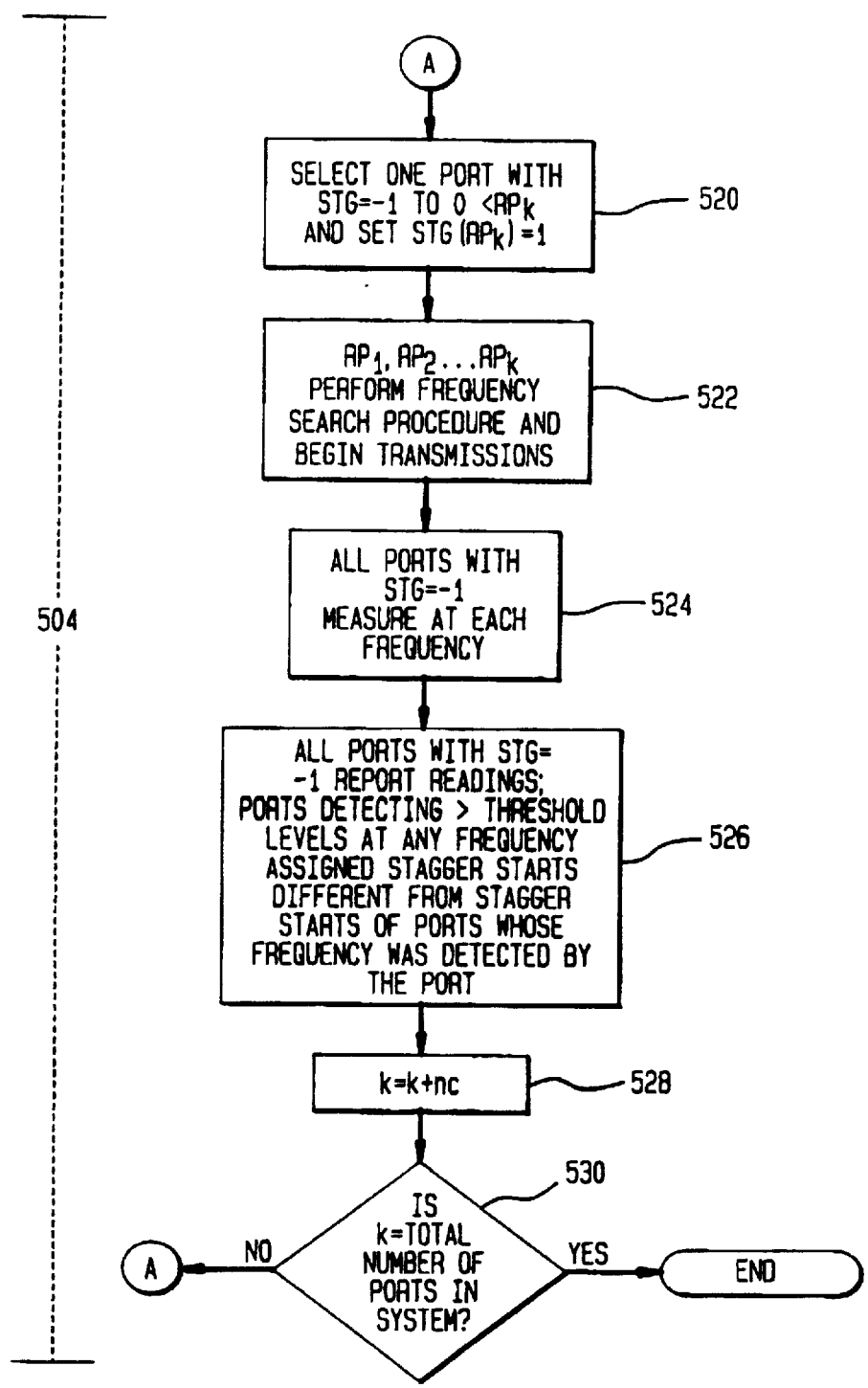

FIG. 5 is a flow chart of a preferred method 500 according to the present invention. The method comprises an initialization phase 502 and an optional iterative phase 504. The initialization phase 502 begins by setting each RP 54 in a UPCS system, such as a PACS-UB system, to have a stagger value (STG) equal to −1 and to set a value k, which represents the number of ports assigned a stagger start time, equal to 0 (step 506). The RPCU 56 to which the RPs are connected elects one RP 54 in the system to be "first" ($RP_1$); and the value of k is increased to k+1 (step 508). This means that $RP_1$ is assigned the first stagger start time period. In the preferred method, $RP_1$ will begin its channel search during the first 2.5 ms time period of the first superframe 302 of a hyperframe 300. $RP_1$ begins its channel search at a first frequency (e.g., in the 3 MHz of the band for a narrow band system). Thus, in a PACS-UB system, the RP may begin searching one of the system channels in the lower 3 MHz of the band. Preferably, the RP randomly selects one of the nine PACS-UB system channels falling entirely within the first 3 MHz. Because $RP_1$ is the only RP searching, it is likely to acquire the first channel it monitors and transmits at that first frequency (step 510). All of the other RPs 54 in the system 50 measure the interference on this first frequency caused by $RP_1$'s as transmission (step 512). All RPs that measure greater than a threshold amount of interference on this first frequency are considered to "hear" $RP_1$, and thus their channel search starts are to avoid co-channel interference (step 514). All RPs 54 that "hear" $RP_1$ are assigned unique STG values, to avoid any interference. The number of RPs assigned a stagger start is set as nc, and k is increased to k+nc, the total number of ports with assigned stagger start times (step 514). Thus, if several RPs having different stagger start times are searching for available channels at the same time, none of these RPs will begin or end a 10 ms channel monitoring period at the same time. This avoids the likelihood of co-channel interference, even for frame synchronized RPs. As noted above, a system may have up to 480 unique stagger start times.

The total number of RPs that "hear" $RP_1$ is counted (step 516). If the total number of RPs 54 that "hear" $RP_1$ is equal to the total number of RPs in the system, then the method is complete (step 518).

If the total number of RPs assigned a stagger start time is less then the total number of RPs in the system (step 518), then the optional iterative steps 504 are performed. All of the RPs that did not "hear" $RP_1$ still have their STG values set to −1 because they have not been assigned stagger start times. The RPCU 54 randomly assigns one of the RPs ($RP_k$ with STG=−1 to have STG=1 (step 520). Because $RP_k$ cannot "hear" $RP_1$ (e.g., cannot detect $RP_1$'s transmissions) there is no co-channel interference if $RP_1$ and $RP_k$ begin their channel search simultaneously.

During the next hyperframe (e.g., during the next 30 sec.), all of the RPs that have assigned stagger start times perform the channel search and begin transmitting on their acquired channels (step 522). During this time, all of the RPs remaining with STG=−1 (e.g., do not yet have an assigned stagger start time) measure the signal strength on all of the channels (step 524). All of the ports that "hear" $RP_k$ strongly (e.g., measured interference on a first frequency higher than a threshold amount), report their measurement on each frequency to the RPCU 54. These RPs are assigned stagger starts based on their measurements on the other channels. That is, if an RP that "hears" $RP_k$ strongly also measures a high interference on a particular frequency, it will not be assigned the same stagger start as the RP (or RPs) that was transmitting on that frequency when the signal was detected (step 526). That is, no RP is assigned a stagger start of any RP that is in interference range with it (i.e., any RP whose transmissions may be detected above a threshold amount by the RP in question). At the end of the hyperframe, the number of RPs that are assigned stagger starts is again counted (step 528). If the number of RPs assigned stagger start times equal the total numbers of RPs in the system, then the procedure is complete (step 530). If unassigned RPs remain, the iterative steps 504 are repeated for the RPs that cannot "hear" $RP_1$ or $RP_k$ until each RP has an assigned stagger start time.

A system 50 having no more than 480 RPs need not perform this procedure. Each RP may be assigned a unique stagger start, without the possibility of interference. That is, each RP may be assigned a stagger start $STG(RP_j)=(T,S)$, where j is the number of total RPs, T is the position of stagger starts in a superframe, and S is the number of superframes in a hyperframe. Thus, in the illustrative example described above STG of $RP_1$=(1,1); $RP_{31}$=(2,1); and $RP_{480}$=(30,16).

Figure 6:
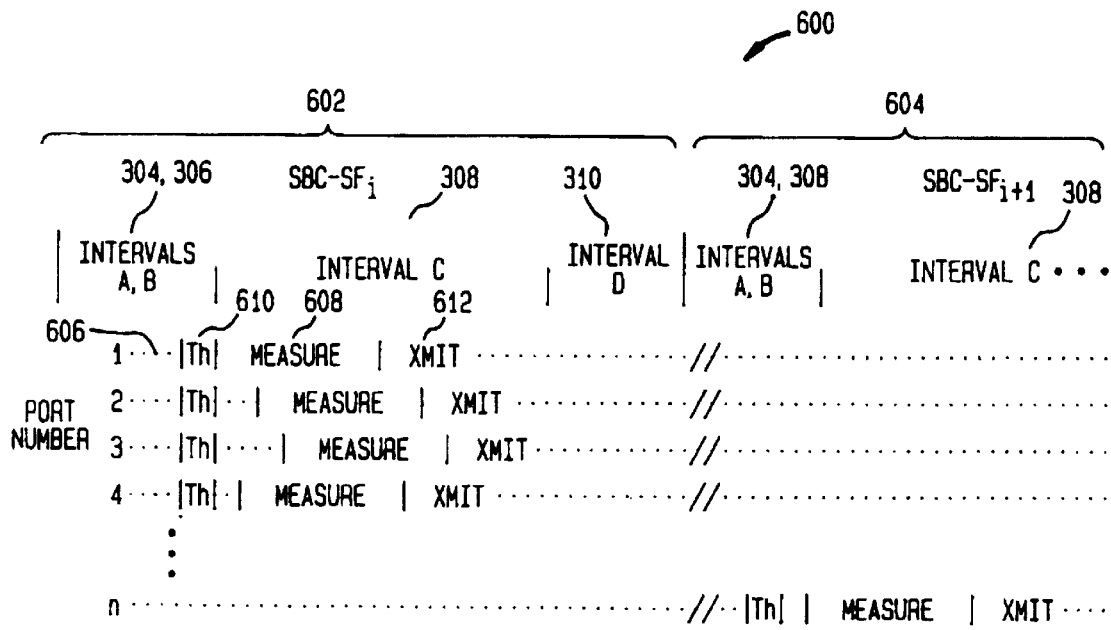
FIG. 6 is a timing diagram illustrating a port channel assignment according to the present invention. Attached as Appendix A is a glossary of acronyms used in this patent application.

FIG. 6 illustrates several benefits of the present invention. FIG. 6 is a timing diagram 600 illustrating port assignments for a system having n RPs using a PACS-UB protocol and performing the method of the present invention. In this illustration, the stagger start times have already been assigned and the RPs have been operating. In this figure, two superframes 302 are shown: $SBC\text{-}SF_i$ 602 and $SBC\text{-}SF_{i+1}$ 604. In the first superframe $SBC\text{-}SF_i$, $RP_1$ is assigned the first stagger start interval, $RP_4$ is assigned the second, $RP_2$ is assigned the third, and $RP_3$ is assigned the fourth. $RP_n$ is assigned a stagger start in phase C of the next superframe $SBC\text{-}SF_{i+1}$ 604. At the beginning of phase A 304 of $SBC\text{-}SF_i$ 602, $RP_1$ has relinquished the channel it has been "advertising" on (e.g., it has completed a hyperframe 300 and no communication was established with an MT 52). $RP_1$ begins its channel search by measuring the interference on available channels during the "measure" interval 608, and the other RPs continue to transmit. This encourages $RP_1$ to acquire a channel to avoid interference from neighboring RPs because it can "hear" their transmissions. (Prior to the "measure" interval 608, the RP may perform adaptive, autonomous LBT threshold measurements during the "TH" interval 608 as described in the related application Ser. No. 08/590,751 described above.) Once $RP_1$ acquires a channel, it "advertises" its availability for communication on the acquired channel during the "Xmit" interval 612. After a brief idle time 606, each RP begins the same process at the RP's assigned stagger start interval, assuming that the RP is not communicating with an MT. The idle time 606 is the time between the beginning of phase C and the beginning of an RP's stagger started frequency search. Thus, the idle time for the RP having the first stagger start time is zero. This arrangement provides (1) a stable port assignment, which is not required, but provides improved access performance for both initial access and for handoffs; and (2) reduces battery usage for MTs.

The present invention is not limited to the disclosed method, but rather various modifications, substitutions, and methods may be used without departing from the scope of the present invention. For example, the preferred embodiment was disclosed with reference to a PACS-UB protocol. A person skilled in the art understands that the invention may be applied to any protocol operable in the UPCS spectrum or in a system that uses an LBT etiquette.

We claim:

1. A method for conducting a channel searching procedure for a plurality of radio ports in a wireless communication system using a listen-before-talk etiquette, comprising the steps of:

a. randomly assigning a first stagger start time to one of the plurality of radio ports;

b. the first radio port transmitting at a first frequency;

c. determining which of the plurality of radio ports detect more than the threshold level of the first radio port transmission;

d. assigning a unique stagger start time to each of the plurality of radio ports that can detect more than a threshold level of each others' transmissions; and e. each radio port assigned a stagger start time beginning the channel search procedure at its assigned stagger start time.

2. The method of claim 1, the method further comprising after the step of beginning the channel search:

a. assigning the first stagger start to a second radio port that did not detect more than a threshold level of transmission from the first radio port;

b. each radio port not having an assigned stagger start time monitoring the channel search procedure; and c. for each radio port not yet having an assigned stagger start time, assigning a stagger start time in a manner to not have the same stagger start time as any other radio port that is in interference range.

3. The method of claim 1, wherein the communication system includes a number of communication frames, the method further comprising the step of dividing the communication frames into a number of stagger start intervals prior to the step of assigning unique stagger start times.

4. A method for conducting a channel searching procedure for a plurality of radio ports in a wireless communication system using a listen-before-talk etiquette, comprising the steps of:

a. if a number of available unique stagger start times is greater than a number of total radio ports in the system, assigning to each radio port a unique stagger start time; and b. if the number of total radio ports in the system is greater than the number of available unique stagger start times, then:

(1) selecting a first radio port to have a first stagger start time;

(2) the first radio port transmitting at a first frequency;

(3) all of the radio ports, except the first radio port, monitoring the first radio port's transmission;

(4) determining which radio ports detect more than a threshold level of the first radio port's transmission; and (5) assigning a unique stagger start time to each radio port that detects more than a threshold level of the first radio port's transmission; and c. each radio port assigned a stagger start time transmitting according to the channel search procedure at its assigned stagger start time.

5. The method of claim 4, wherein after the step of assigning a unique stagger start time to each radio port that detects more than a threshold level of the first radio port's transmission, the method further comprising the steps of:

a. determining if every radio port in the system has an assigned stagger start time;

b. if every radio port in the system does not have an assigned stagger start time, then:

(1) selecting a second radio port that does not have an assigned stagger start time to have the first stagger start time;

(2) all of the radio ports not having assigned stagger start times monitoring the transmissions of the radio ports having assigned stagger start times;

(3) determining which radio ports not having assigned stagger start times detect more than a threshold level of the transmissions of the radio ports having assigned stagger start times; and (4) for each radio port not yet having an assigned stagger start time, assigning a stagger start time different from the stagger start times assigned to any other radio ports such radio port can detect more than a threshold level of such other radio port's transmission.

6. A method for conducting a channel searching procedure for a plurality of radio ports in a wireless communication system using a listen-before-talk etiquette, wherein the communication system includes a hyperframe comprising a number of superframes, each superframe being divided into a number of time intervals during which radio ports conduct channel searches, the method comprising the steps of:

a. assigning a unique time interval to each of the plurality of radio ports according to $STG(RP_j)=(T,S)$, where:

$STG(RP_j)$=a channel search time interval for radio port j, where j is an integer from 1 to the total number of radio ports in the system;

T=a position of a channel search time interval in a superframe; and

S=the number of superframes in the hyperframe; and b. each radio port beginning the channel search procedure at its assigned time interval.

* * * * *